Dec. 26, 1939.  G. C. MILLER  2,184,919
DRILLING APPARATUS.
Filed April 5, 1938   2 Sheets-Sheet 1
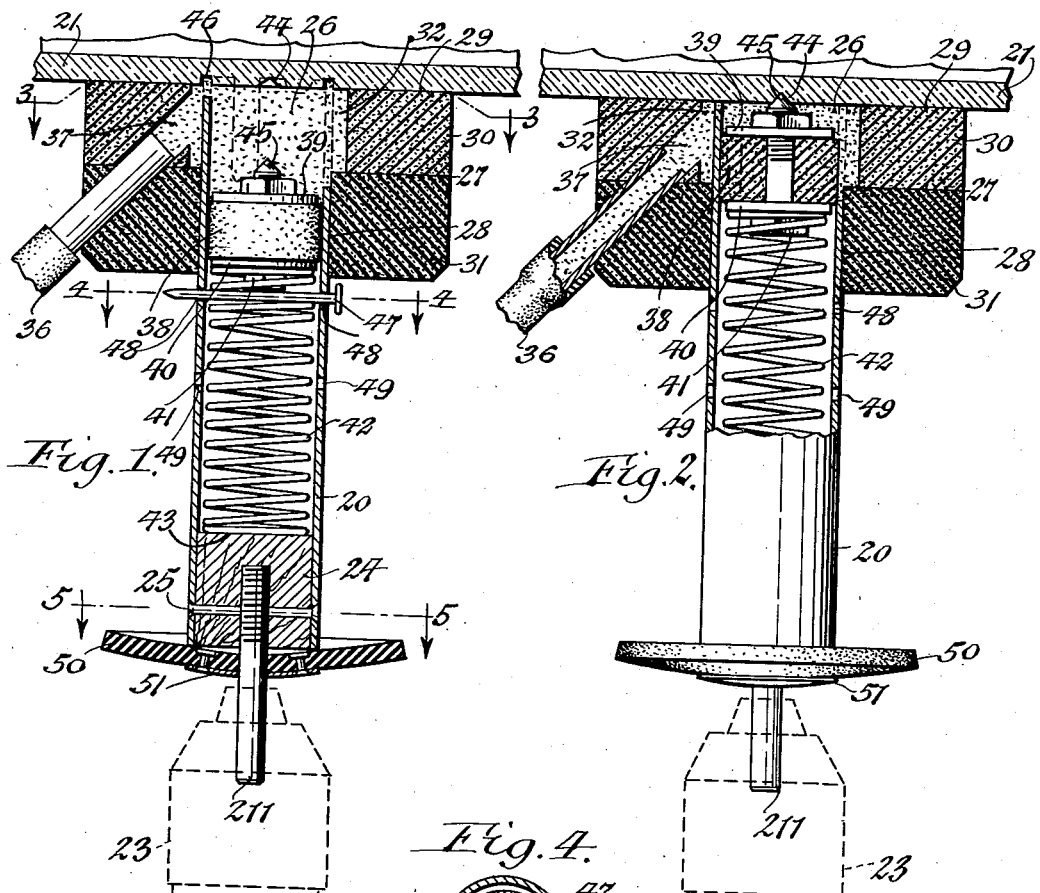
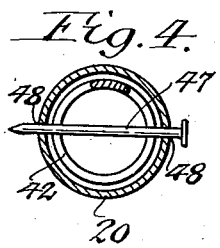
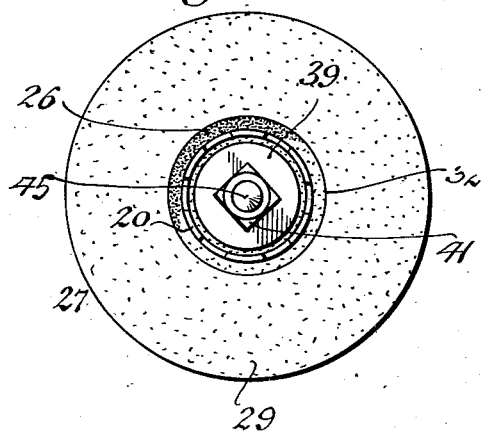
INVENTOR
Gottfried C. Miller
BY
ATTORNEYS.

Dec. 26, 1939.   G. C. MILLER   2,184,919
DRILLING APPARATUS
Filed April 5, 1938   2 Sheets-Sheet 2
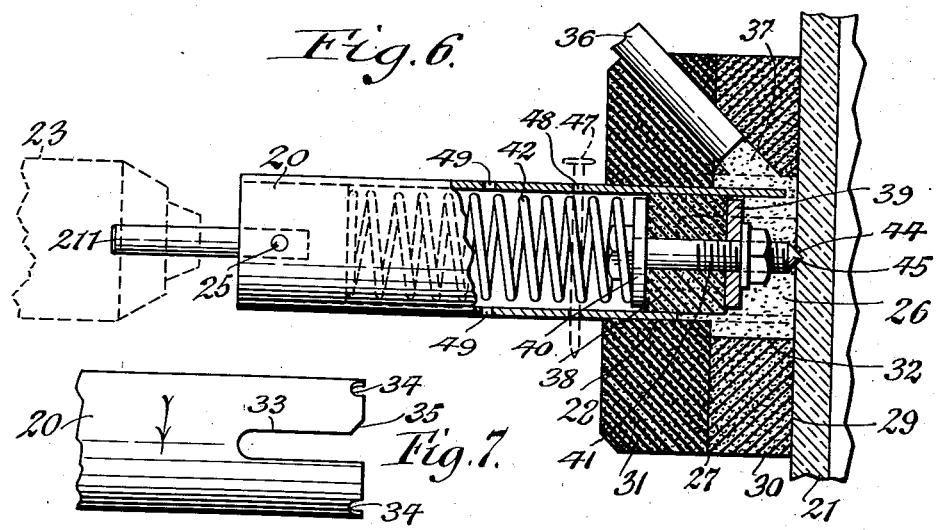
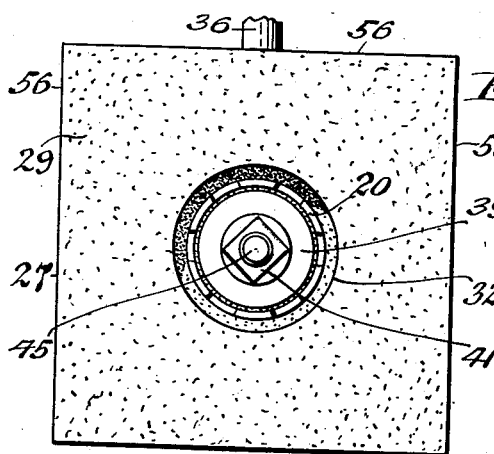
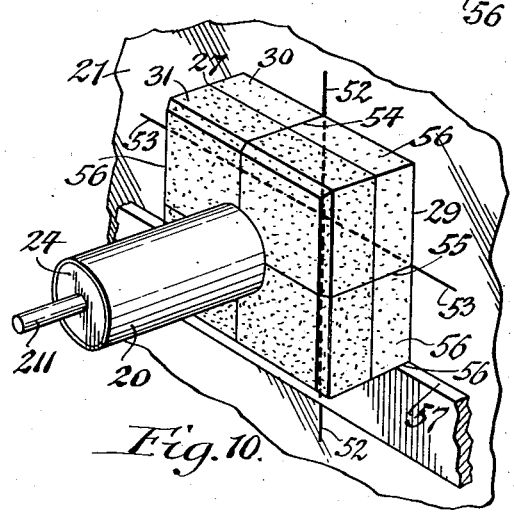
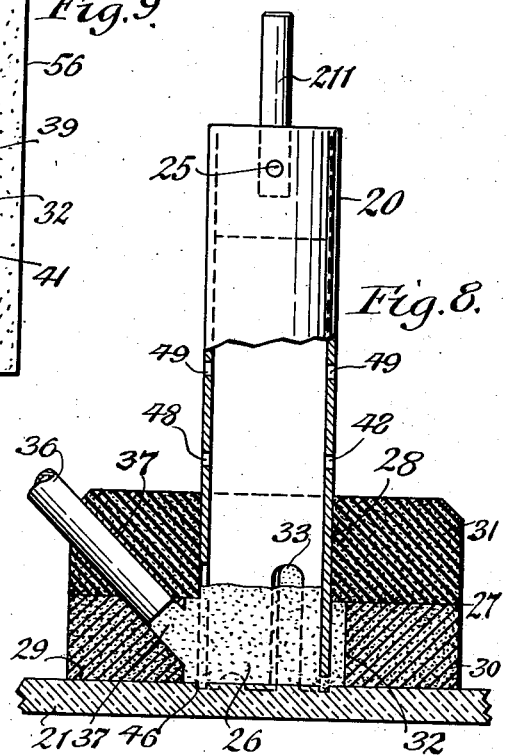
INVENTOR
Gottfried C. Miller
BY
ATTORNEYS.

Patented Dec. 26, 1939

2,184,919

UNITED STATES PATENT OFFICE 2,184,919

DRILLING APPARATUS

Gottfried C. Miller, Buffalo, N. Y.

Application April 5, 1938, Serial No. 200,202

4 Claims. (Cl. 125—20)

This invention relates to a portable drill or boring apparatus for producing holes in a body of vitreous or ceramic material such as tile, glass, porcelain, cement, marble and the like for the reception of pipes, rods, or other fixtures when equipping a bathroom, kitchen or other installation.

The devices heretofore in use for this purpose were not only complicated and expensive in construction but the same were also inconvenient to use in all positions and also liable to wear unduly rapidly and thus necessitate frequent renewal of some of their parts.

It is the object of this invention to provide a drilling apparatus for this purpose which is comparatively simple in construction, not subject to undue wear, easily operable in any desired position and capable of being worked rapidly, accurately and economically.

In the accompanying drawings:

Fig. 1 is a vertical longitudinal section of one form of drilling apparatus embodying this invention and showing the position of the parts after the preliminary cutting of a circular groove has been effected preparatory to completing the boring operation.

Fig. 2 is a similar view showing the position of the parts preparatory to effecting the initial cutting operation on the body which is to be perforated.

Fig. 3 is a front end view of the device taken on line 3—3, Fig. 1.

Figs. 4 and 5 are cross sections taken on the correspondingly numbered lines in Fig. 1.

Fig. 6 is a longitudinal section showing this device in a position for boring a hole in an upright wall of a building.

Fig. 7 is a side elevation of the front part of the bit forming part of this drilling apparatus.

Fig. 8 is a longitudinal section showing the organization of the drilling device when the same is used for boring a hole in a floor.

Fig. 9 is a front view of the apparatus showing a modified form of the guide for the cutting bit in which case the guide is made of square form in construction as compared with the round form shown in Fig. 3.

Fig. 10 is a perspective view showing the manner of locating the drilling device relative to a vertical surface which is to be bored when the guide for the bit is of rectangular form.

In the following description similar characters of reference indicate like parts in the several figures of the drawings.

The numeral 20 represents a tubular cutting, boring or drilling bit which may be constructed of any suitable material, such as sheet metal, and adapted to be engaged at its front end with the body or workpiece 21 which is to be bored and rotated while thus engaged. Rotary movement for this purpose may be imparted to the bit by various means such, for example, as an ordinary bit brace but it is preferable to employ an electrical motor inasmuch as this permits the boring of the hole to be effected with less labor and greater convenience and also more rapidly. In order to permit the drill bit to be connected with the driving means the rear end of the same is provided with a coupling stem or shank 211 which is adapted to be grasped by the chuck 23 of a motor or bit brace. The inner end of this shank may be secured to the rear end of the bit in diverse ways, that shown in the drawings being satisfactory and consisting of a plug 24 seated in the rear end of the bit and receiving the driving shank, and a connecting pin or rivet 25 passing through the adjacent parts of the bit, plug, and driving shank, as shown in Figs. 1 and 5.

For the purpose of expediting the drilling operation of the bit an abrasive 26 in granular or powdered form and preferably mixed with water, is supplied to the front end of the bit while the same is rotating in engagement with the body which is being bored and at the same time the front end of the bit is guided and held in the proper position. The preferred means for thus guiding the bit and supplying an abrasive to the front thereof are constructed as follows:

The numeral 27 represents a guide block having a central opening 28 which receives the front part of the drilling bit and forms a bearing therefore so that the bit can rotate in said guide and also move longitudinally relatively thereto. The front side 29 of this guide block is flat and arranged in a plane at right angles to the axis of the drilling bit and adapted to be held in engagement with the surface of the body which is being bored either by hand or otherwise. This guide block is constructed of resilient material, but preferably of rubber which is of a spongy character inasmuch as this has the capacity of resisting wear when engaged by the granular abrasive supplied to the front end of the drilling bit. In the preferred construction this resilient guide block comprises a front section 30 which is constructed of comparatively soft sponge rubber and a rear section 31 which is constructed of relatively harder or more solid sponge rubber, these two sections being secured to each other by cement so that when united they practically form an integral structure. By thus forming the guide block of a soft front part it is possible to produce a tight joint between the same and the surface of the body being bored, and thereby avoid leakage of the granular abrasive outwardly between this guide and the workpiece while the tool is in operation, and by constructing the rear part of this guide of relatively hard or more solid sponge rubber a firm support for the rotary bit is provided which will reliably hold the same in the proper position relatively to the workpiece which is being drilled and thereby ensuring accurate workmanship in the formation of the hole therein. By making the guide for the rotary bit of sponge rubber or similar material, wear upon this guide due to the presence of granular abrasive between the same and the rotary bit is reduced to a minimum inasmuch as sponge rubber permits the granular abrasive to become embedded therein instead of being held unyieldingly against the periphery of the rotary drilling bit, thereby avoiding the necessity for frequent replacement and the expense incident thereto.

In the preferred construction the front part of the central opening in the guide block is enlarged compared with the front part of this opening which forms the bearing for the bit, thereby forming an annular pocket 32 around the front part of the bit which is adapted to hold the granular abrasive used in connection with the bit for effecting the drilling or cutting of the hole in the body which is to be perforated. This granular material may consist of any suitable abrasive, preferably powdered carborundum which is mixed with a sufficient amount of water to permit its flow from the pocket 32 to the front end of the cutting bit. In order to permit this mixture of powdered abrasive and water to reach the front end of the bit, the latter is provided with one or more notches extending rearwardly from the front edge thereof. In the preferred construction a plurality of such notches are employed, some of which are comparatively deep or long, as shown at 33 and others comparatively shallow or short, as shown at 34, these deep and shallow notches alternating with each other, as shown in Fig. 7. By thus alternating these deep and shallow notches a constant flow of the abrasive from the pocket in the guide block to the interior of the tubular bit is ensured so as to always maintain abrasive at the front edge of the bit and produce a good cutting action thereat while engaging the body to be bored inasmuch as these deep or long notches always extend into the pocket of the guide block. The shallow notches in the tubular bit positively hold some of the powdered abrasive in close contact with the body which is being bored, thereby promoting the cutting action as the bit rotates in engagement with this body and causing the hole to be bored more rapidly.

If desired the trailing corner of one or more of the notches may be inclined or bevelled as shown at 35 in Fig. 7, thereby ensuring crowding some of the abrasive by the wedge or cam action of the incline or bevel into the space between the front end of the bit and the working surface of the body being bored and ensuring rapid cutting or boring action.

The granular abrasive mixed with sufficient water to render the mixture fluid may be supplied from any suitable source through a tube 36 the inner end of which terminates in a feed opening 37 formed in the guide block and extending to the pocket 32 in the latter. The fluid mixture of granular abrasive and water may be supplied to the outer end of this supply tube, under pressure if necessary, to suit the particular conditions or locations under which the tool is being operated.

When using this tool for boring a hole in an overhead body 21, as shown in Figs. 1 and 2, means are provided whereby the fluid abrasive is automatically pushed upwardly in the tubular bit so as to replenish this abrasive as the same is used up at the front end of the bit. The preferred means for thus automatically feeding the abrasive to the front end of the bit comprises a plunger or piston 38 consisting of sponge rubber or the like which is constantly pressed toward the front edge thereof by spring means. In the preferred construction disks or washers 39, 40 are engaged with the front and rear sides of the plunger and connected with each other by means of a bolt 41 passing centrally through these disks and the plunger thereby holding the periphery of the plunger reliably in engagement with the bore of the tubular bit and reducing leakage through the joint between the same to a minimum. The spring means for moving the plunger forwardly preferably consist of a helical spring 42 arranged in the tubular bit and bearing at its opposite ends against the rear disk 40 and a forwardly facing shoulder 43 formed by the inner end of the plug 24 as best shown in Fig. 1.

For the purpose of properly locating the opening which is to be drilled or bored in the body or workpiece 21, the center of this opening is first spotted or preliminarily formed by means of a suitable tool so as to form a conical recess 44 in this body, as shown in Fig. 2. Thereafter a sufficient amount of abrasive is placed in the pocket 32 of the guide block and the front part of the tubular bit to permit a preliminary cutting operation to be performed on the body which is to be bored. The spotting recess 44 is now engaged by a conical centering point 45 on the front end of the bolt 41 of the plunger, the guide block is engaged with the body which is to be bored, as shown in Fig. 2, and then an annular groove or kerf 46 is cut in the surface of the body by rotation of the bit in the presence of the abrasive. The tool is now disengaged from the body or workpiece and the plunger is pushed backwardly in the tubular bit in order to form a cavity in the front end of the latter for the reception of a substantial amount of fluid abrasive, as shown in Fig. 1. The plunger may be temporarily held in this retracted position by any suitable means, for example, by means of a retaining pin 47 passing through openings in the tubular bit in rear of the plunger and through the adjacent part of the spring 42 so as to prevent the latter from expanding, as shown in Fig. 1. In order to permit this plunger to be held in a retracted position at different points in the length of the tubular bit the latter is provided on its diametrically opposite sides with a plurality of pairs of retaining openings 48, 49 the members of each pair being located at different places in the length of the tubular bit, as shown in Fig. 1, thereby enabling the plunger after being pushed inwardly or backwardly the desired distances from the front end of the tubular bit to be held there and thus vary the size of the cavity in the front end of the bit and the amount of abrasive which is possible to introduce into the same to suit the requirements of the particular hole which is to be bored or drilled.

After the front end of the bit and the surrounding pocket of the guide block has been filled with the required amount of abrasive, the guide block is placed in the proper position with reference to the preliminary groove or kerf 46 which has been formed in the workpiece or body, as shown in Fig. 1, and then the retaining pin 47 is withdrawn thereby releasing the plunger and permitting the spring 42 to push the abrasive forwardly so that upon engaging the front end of the tubular bit with this kerf and rotating the bit, the cutting of the same will be rapidly completed. The completion of this cutting occurs when the front end of the bit reaches the inner side of the workpiece and when thus completed a cylindrical core is severed from the workpiece or body, this core upon being removed forming the hole which receives the pipe, rod or other fitting.

In order to catch any fluid abrasive which may leak through the joints between the bit, the plunger and the guide block and prevent the same from dropping on to the motor or the hands of the operator who is manipulating the drilling apparatus, a guard or shield 50 having preferably the form of an upwardly dished or cupped disk of rubber is mounted on the lower part of the tool so as to catch these abrasive drippings. This guard is provided with central metal washer 51 which is secured thereto by means of rivets or otherwise. The washer and guard are provided with a central opening whereby the same may be slipped over the driving shank 211 and engaged with the rear end of the tubular bit and thus form an annular flange which projects beyond the periphery of the bit, as shown in Figs. 1 and 5, for intercepting and retaining any drippings which may run down the tubular bit.

When using the tool for boring a horizontal hole in an upright wall, as shown in Fig. 6, the guard or shield 50 may be omitted inasmuch as there is little, if any, liability of fluid abrasive creeping along the tubular bit toward the rear or outer end thereof and interfering with the operation of the tool.

When boring a vertical hole in a tile or other workpiece which is arranged on the floor of a building or when using the tool under like conditions for boring other bodies, as shown in Fig. 10, the plunger and the spring means for feeding the granular abrasive may be omitted inasmuch as the abrasive at this time will feed downwardly by gravity in the bit and the guide block.

Various means may be provided for properly locating the bit of the drilling apparatus on the body or surface which is to be bored. One way of accomplishing this purpose is to draw on the body which is to be bored two lines 52, 53 at right angles to each other so that the same cross on the point representing the center of the hole which is to be bored, and also providing the guide block on its periphery with marks 54, 55 which are arranged in planes at right angles to one another, whereby upon registering the marks on the guide block with the lines on the body, as shown in Fig. 10, the center of the bit will be alined with intersection of the lines 52, 53 and thus permit the hole to be bored in the proper place.

If desired the guide block may be provided with one or more flat sides 56 on its periphery, for example four of such sides, as shown in Figs. 9 and 10, which permit any one of these flat sides to be engaged with a straight edge 57, as shown in Fig. 10, and the guide block shifted lengthwise thereof for properly locating and boring a plurality of holes in relation to this straight edge, thus ensuring uniformity of the work.

I claim as my invention:

1. A drilling apparatus comprising a rotatable tubular bit adapted to be engaged at its front end with a body to be bored, and a guide of sponge rubber surrounding said bit and adapted to engage said body, the front part of said guide being constructed of comparatively soft sponge rubber and the rear part of said guide being constructed of relatively hard sponge rubber and having a bearing opening in which said bit is fitted to turn and slide lengthwise as the front end of the bit wears.

2. A drilling apparatus comprising a rotatable tubular bit adapted to be engaged at its front end with a body to be bored, and a guide of sponge rubber surrounding said bit and adapted to engage said body, the front part of said guide being constructed of comparatively soft sponge rubber and the rear part of said guide being constructed of relatively hard sponge rubber, and the soft front part of said guide being provided around the front end of said bit with a pocket adapted to receive an abrasive and water and deliver the same to the front end of said bit and the rear part of said guide having an opening in which said bit is fitted to turn and slide.

3. A drilling apparatus comprising a rotatable tubular bit, a guide surrounding said bit and having means for delivering an abrasive to the front end of said bit, means within the bit for moving the abrasive therein to the front end of the same, including a sponge rubber plunger arranged within the bit, and a spring arranged within the bit and bearing at one end against said plunger and at its opposite end against an internal shoulder on the bit, and means for holding said spring in a retracted position at different points lengthwise of the bit including a plurality of holes arranged in longitudinal rows in said bit, and a pin adapted to pass through one or another of said pairs of holes and engage with said spring in a more or less retracted condition.

4. A drilling apparatus comprising a rotatable tubular bit, a guide for the bit adapted to engage the body to be drilled, means for supplying abrasive to the front end of said bit, means for moving said abrasive toward the front end of the bit including a plunger movable lengthwise in the said bit, a spring for moving said plunger forwardly interposed between the rear end of said plunger and a shoulder on the rear part of said bit, and a centering pin mounted on said plunger and adapted to engage a spot on the body to be bored for locating the bit thereon before introducing the abrasive into the bit between the plunger and the body to be drilled.

GOTTFRIED C. MILLER.